US010098271B2

(12) United States Patent
Steffan et al.

(10) Patent No.: US 10,098,271 B2
(45) Date of Patent: Oct. 16, 2018

(54) SPLIT FUNCTION VALVE

(71) Applicant: UNVERFERTH MANUFACTURING CO., INC., Kalida, OH (US)

(72) Inventors: Thomas Steffan, Cloverdale, OH (US); John Garberson, Columbus Grove, OH (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 255 days.

(21) Appl. No.: 14/823,452

(22) Filed: Aug. 11, 2015

(65) Prior Publication Data
US 2016/0081260 A1 Mar. 24, 2016

Related U.S. Application Data

(60) Provisional application No. 62/052,716, filed on Sep. 19, 2014.

(51) Int. Cl.
*A01B 63/00* (2006.01)
*A01B 73/04* (2006.01)

(52) U.S. Cl.
CPC .......... *A01B 63/008* (2013.01); *A01B 73/044* (2013.01)

(58) Field of Classification Search
CPC ... F15B 11/20; F15B 11/205; F15B 2211/783; A01B 73/02; A01B 73/04; A01B 73/044
See application file for complete search history.

(56) References Cited

U.S. PATENT DOCUMENTS

| | | | | |
|---|---|---|---|---|
| 3,156,306 A * | 11/1964 | Dunker | ............... | A01B 23/046 172/456 |
| 3,918,529 A * | 11/1975 | Frager | ................. | A01B 23/046 172/294 |
| 4,151,886 A * | 5/1979 | Boetto | ................... | A01B 73/02 172/311 |
| 4,355,690 A * | 10/1982 | Jensen | ................ | A01B 73/044 172/311 |
| 4,441,562 A * | 4/1984 | Cooper | .................. | A01B 73/02 172/311 |
| 4,738,315 A * | 4/1988 | Kinzenbaw | .......... | A01B 73/005 172/310 |
| 5,839,516 A * | 11/1998 | Arnold | ................. | A01B 73/065 172/311 |
| 2004/0146406 A1* | 7/2004 | Last | ....................... | E04H 4/082 417/3 |

* cited by examiner

*Primary Examiner* — F. Daniel Lopez
*Assistant Examiner* — Matthew Wiblin
(74) *Attorney, Agent, or Firm* — Rothwell, Figg, Ernst & Manbeck, P.C.

(57) ABSTRACT

A method includes converting a single input flow into two output flows. The method further includes sequencing the output flows to completely raise a machine prior to folding of wings associated with the machine.

9 Claims, 5 Drawing Sheets

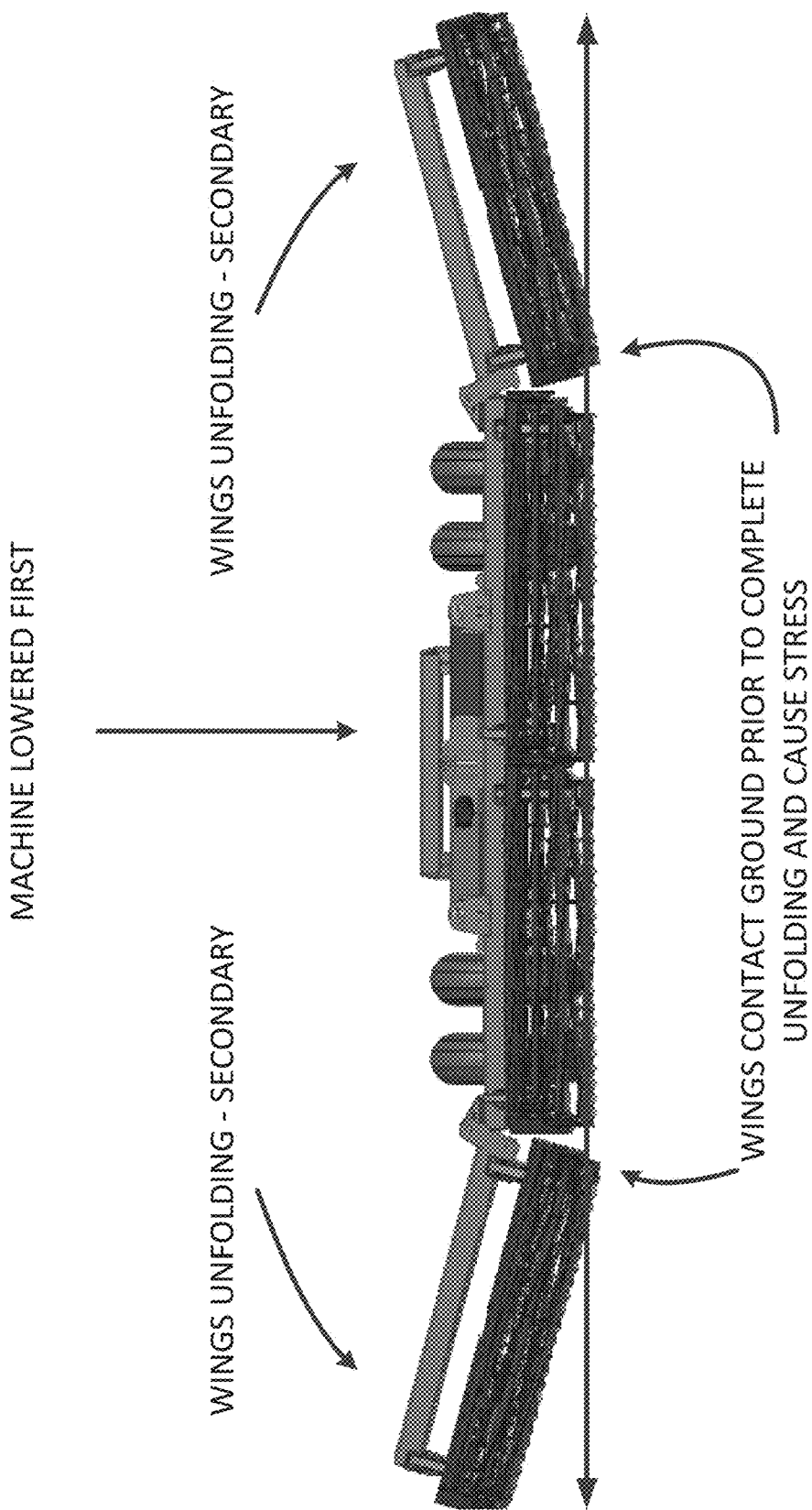

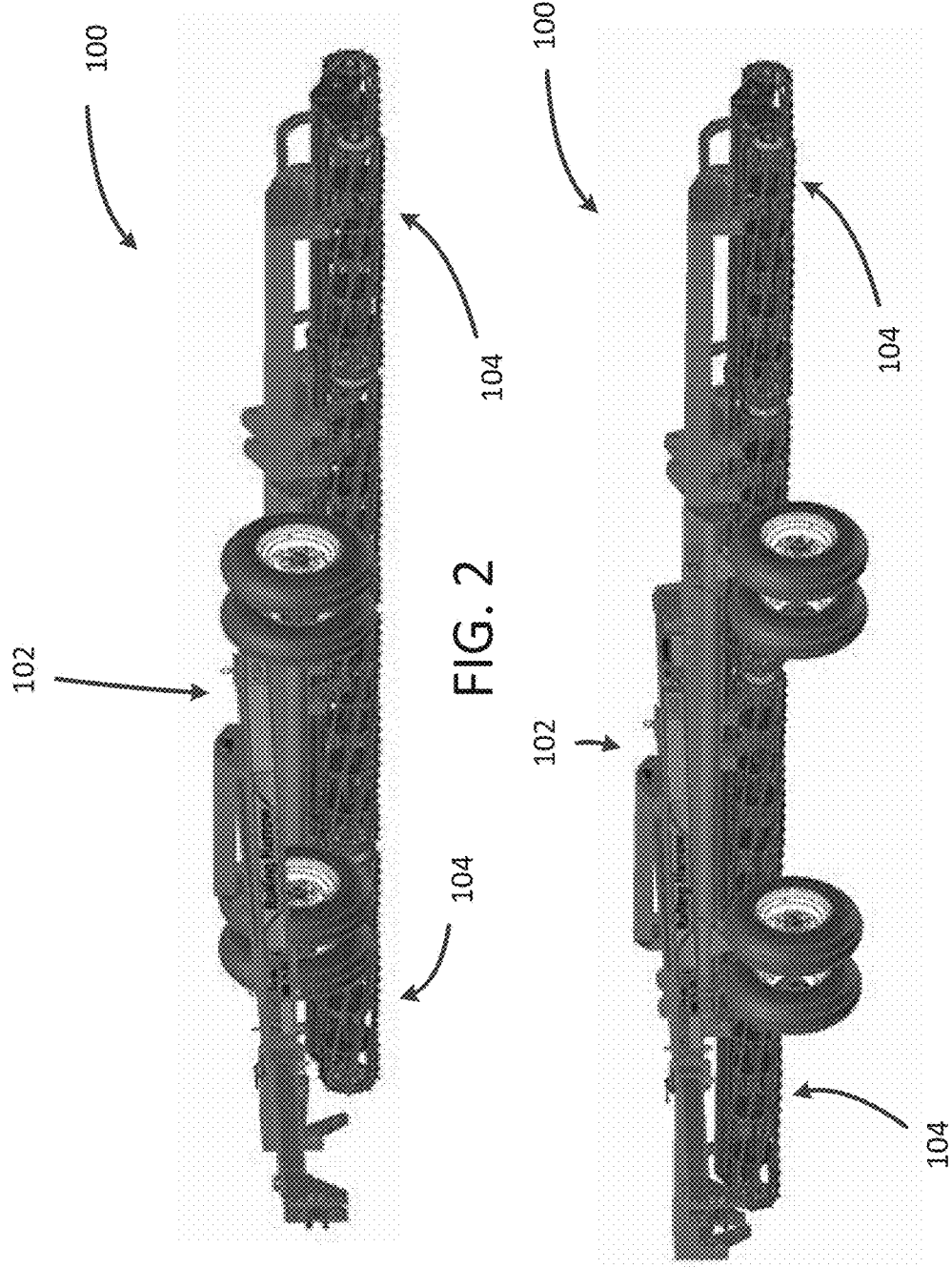

SPLIT FUNCTION VALVE

BACKGROUND OF THE INVENTION

Field of the Invention

The present invention relates to the field of equipment control.

Description of the Background Art

Various types of equipment/machinery can be operated and controlled by using some kind of control mechanism. For example, the control mechanism can use a variety of different systems, such as hydraulic systems, pneumatic systems, and/or other types of systems. Furthermore, the control mechanism may include different types of valves, pumps, motors, reservoirs, and/or other components to implement the control mechanism.

For example, in the agriculture industry, there are many types of tillage tools that are controlled and operated using a control mechanism. These tillage tools can be designed to be towed behind a vehicle, such as a tractor, so as to prepare a field to facilitate in the planting of crops. The control of the tillage tools may be provided, for example, by a hydraulic supply located on the vehicle. The vehicle can tow and control multiple tillage tools.

Some tillage tools may have a wing fold system associated with a lifting system that uses a single hydraulic system for control and operation of the tillage tool. Accordingly, the single hydraulic system can simultaneously raise the tillage tool and fold the wings upwards so as to transport the tillage tool. This simultaneous functionality may not always be desirable. Each time the tillage tool is raised, a load is created in the wing folding linkage of the tillage tool. This results in unnecessary stress and fatigue upon the wing folding linkage as the wing fold linkage does not need to become loaded for in-field performance. This is further shown in FIG. 1 which describes how when lowering the machine first and then unfolding the wings, the wings contact the ground prior to complete unfolding which results in additional stress.

Other issues can occur as a result of when a tillage tool is lowered prior to unfolding the wings. For example, the ground engaging portions of the tillage tool are pinched into the ground which causes stress on the frames of the tillage tool. While this can be alleviated by driving the vehicle forward as the wings are being unfolded, this can be time consuming and also requires a large area of land to properly unfold the machine.

A number of existing kits allow for optimized control of various tillage tools. For example, a dual hydraulic kit can optimize hydraulic functionality; however, this requires two hydraulic power sources. Another existing solution is a wing lockout kit that blocks hydraulic oil from the wing fold circuit while allowing for the raising and lowering of the machine during operation. However, the wing lockout kit requires the operator to manually control a valve each time the operator needs to enter or exit a field that requires tilling.

SUMMARY OF THE INVENTION

In accordance with aspects of the invention, a method includes converting a single input flow into two output flows. The method further includes sequencing the output flows to completely raise a machine prior to folding of wings associated with the machine.

BRIEF DESCRIPTION OF DRAWINGS

FIG. 1 is an example view of a machine;

FIG. 2 is an example view of a machine accordance with aspects of the present invention;

FIG. 3 is an example view of a machine in accordance with aspects of the present invention;

DETAILED DESCRIPTION

Figure 4:
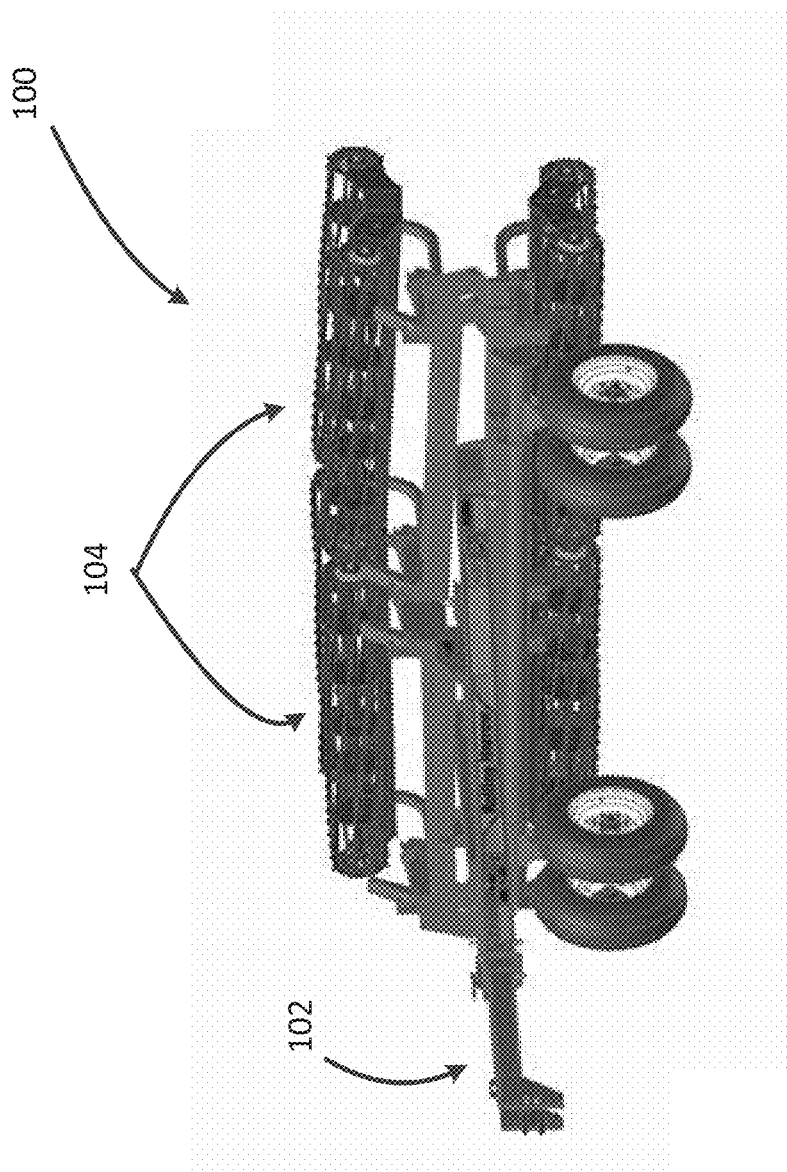
FIG. 4 is an example view of a machine in accordance with aspects of the present invention.

Apparatus, systems, and methods described herein may create a control system that prevents various types of machinery from performing one operation prior to the performance of another operation. As such, the present invention provides for a control system that can reduce stress and fatigue to various portions of the machinery. For example, the machinery may be tillage tools used within the agricultural industry (e.g., farming) and the control system may reduce stress and fatigue associated with the operation of the tillage tool. In embodiments, the tillage tools can include wings that are raised and lowered by the control system. The wings, for example, can be a device that, when lowered, tills the field. In embodiments, the control system may first lift the tillage tool and then fold the wings of the tillage tool. Additionally, or alternatively, the control system may unfold the wings and then lower the tillage tool.

As a result, the control system allows for (i) using a single hydraulic power source on a vehicle (e.g., a tractor) that transports one or more tillage tools, (ii) preventing the simultaneous operation of the raising of the tilling tool and the folding of the wings, (iii) preventing stress and fatigue on the wings by preventing loading in the wing folding linkage each time the tilling tool is raised, and (iv) preventing stress on the tillage tool's frames by preventing the machine from being lowered prior to unfolding the wings. As such, the control system utilize one or more unique and novel configurations that provide for optimal control that reduces the maintenance costs and/or increases the equipment life of the tillage tool.

While the examples below provide descriptions of detailed embodiments, the invention is not intended to be limited in scope of interpretation to any particular embodiment. Rather, the examples are non-limiting and other embodiments within the scope of the invention may be implemented. Furthermore, while the term "wing" may be used to describe different features of a tilling tool, other terms may be used, such as "wing folding linkage system," "cultivating tool," "cultivating system," "agricultural tool," "ripping tools," and/or any other term. Additionally, or alternatively, while the control system may be associated with tilling tools, the control system can be associated with other types of agriculture equipment and also associated with other type of equipment in other industries (e.g., construction, manufacturing etc.).

FIG. 2 is an example view of tilling tool 100 in accordance with aspects of the present invention. As shown in FIG. 2, tilling tool 100 includes machine 102 and wings 104. In embodiments, tilling tool 100 can be connected to a vehicle (e.g., a tractor) whereby the connection to the vehicle can include a connection for controlling tilling tool 100. In embodiments, the connection for controlling tilling tool 100 may include a hydraulic fluid based control system. In additional embodiments, the connection for controlling tilling tool 100 may include a pneumatic based control system. In embodiments, the control system may include valves, pumps, motors, and/or other devices to control the movement of the machine 102 and the wings 104. As such, the control system can result in machine 102 being lowered and wings 104 being unfolded so that tilling tool 100 can be used within a field to till the soil. The control system may be further described in FIG. 5 and/or FIG. 6.

FIG. 3 is an example view of tilling tool 100 in accordance with aspects of the present invention. As shown in FIG. 3, tilling tool 100 has machine 102 raised and wings 104 unfolded by the control system, as described above. Thus, the vehicle (connected to tilling tool 100) can turn at, or near, a field's end portion to begin tilling another portion of the field.

FIG. 4 is an example view of tilling tool 100 in accordance with aspects of the present invention. As shown in FIG. 4, tilling tool 100 has machine 102 raised and wings 104 folded by the control system, as described above. Thus, the vehicle (connected to tilling tool 100) can transport tilling tool 100 when tilling a field is no longer required.

Figure 5:
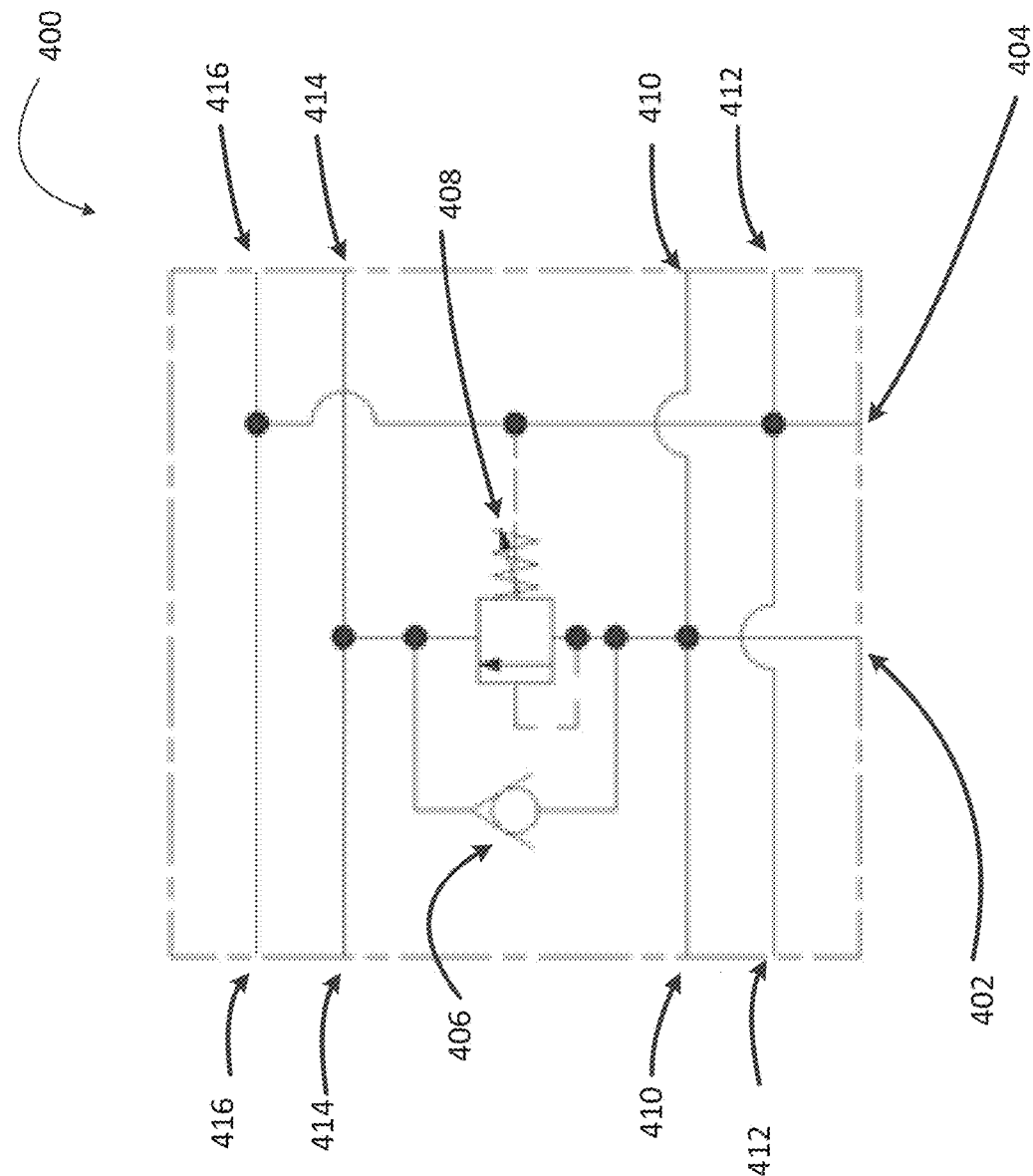
FIG. 5 is an example schematic of a control system in accordance with aspects of the present invention.

FIG. 5 is an example schematic of a control system in accordance with aspects of the present invention. FIG. 5 describes a control system 400 which includes input flow 402, output flow 404, check valve 406, valve 408, lift cylinder base-end 410, lift cylinder rod-end 412, wing fold cylinder rod-end 414, and wing fold cylinder base-end 416. In embodiments, any lines shown in control system 400 that are on the non-pressure side of any circuit is free flow to a tank for storing fluid (e.g., oil) associated with the control system 400. In embodiments, control system 400 may control tilling tool 100 in different operational modes as described in FIGS. 2-4.

In embodiments, a combination valve converts a single input flow 402 from the control system source (e.g., hydraulic oil) into two output flows, output flow at 410 and an output flow at 414. In embodiments, control system 400 sequences the output flows to completely raise machine 102, as described above, prior to folding wings 104. In embodiments, control system 400 uses input flow 402 to create pressure at 410 to the base end of the lift cylinders of machine 102 which results in machine 102 being raised. In embodiments, valve 408 may only provide pressure to 414 once the amount of pressure reaches a particular quantity (e.g., 100 pounds per square inch (PSI), 400 PSI, 1000 PSI, etc.). In embodiments, valve 408 can be a sequencing valve and/or any other type of valve. In embodiments, check valve 406 prevents the flow of control fluid (e.g., hydraulic oil) from bypassing the flow direction of valve 408. In embodiments, upon the pressure reaching a particular quantity, valve 408 may provide pressure to 414 which results in the rod end of the wing fold cylinders being pressurized and allowing wings 104 to fold up. In embodiments, once flow is reversed, output flow 404 causes pressure at 416 and 412 to cause the machine to lower and the wings to unfold simultaneously.

Figure 6:
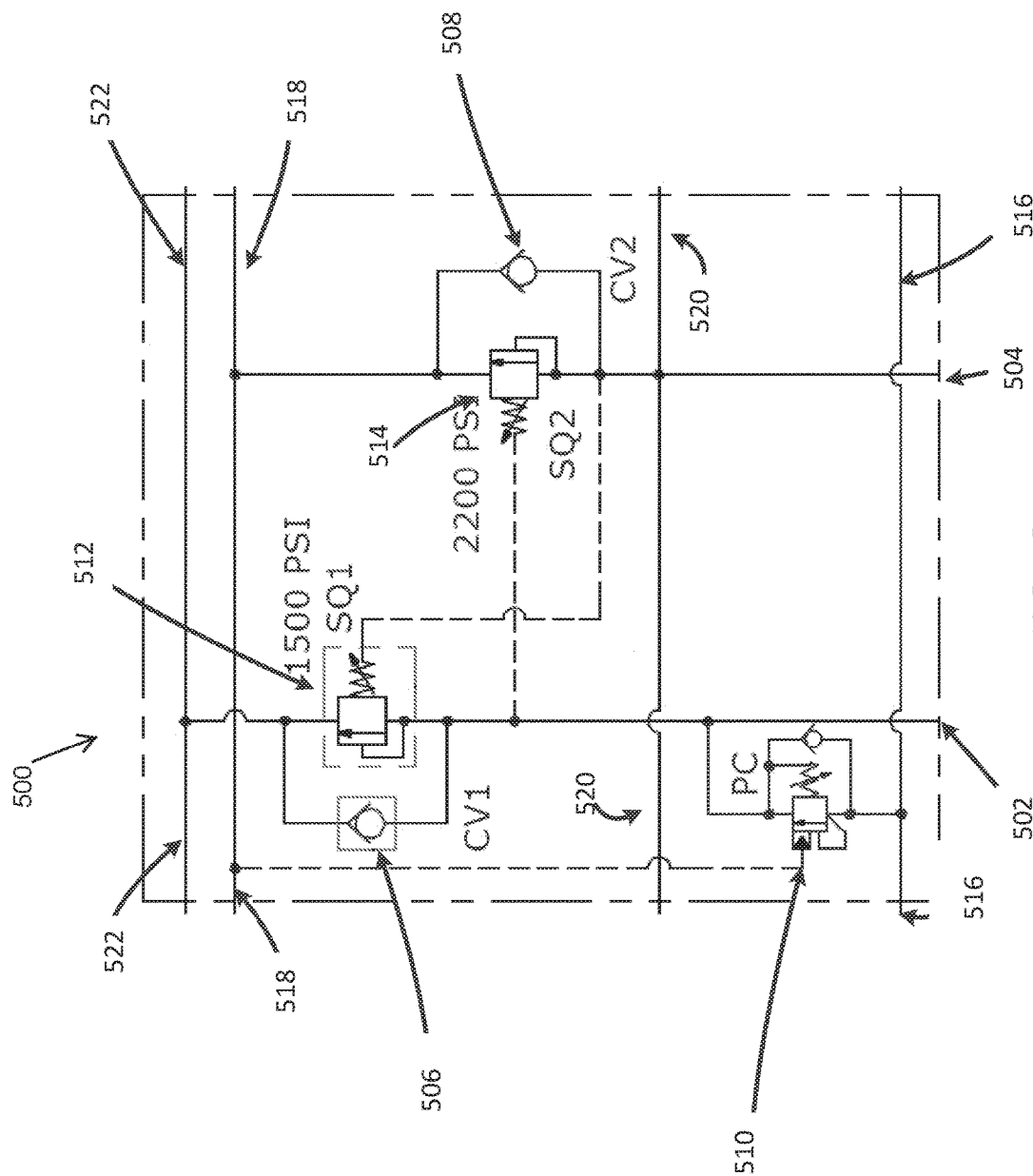
FIG. 6 is an example schematic of a control system in accordance with aspects of the present invention.

FIG. 6 is an example schematic of a control system in accordance with aspects of the present invention. FIG. 6 describes a control system 500 that includes input flow 502, output flow 504, check valves 506, and 508, valves 510, 512 and 514, lift cylinder base-end 516, lift cylinder rod-end 518, wing fold cylinder base-end 520, and wing fold cylinder rod-end 522. In embodiments, except for return flow from lift cylinder base-end 516, any lines shown in control system 500 that are on the non-pressure side of any circuit are free flow to a tank for storing fluid (e.g., oil) associated with the control system 500. In embodiments, return flow from lift cylinder base-end 516 is prevented by counterbalance valve 510 until pilot pressure from lift cylinder rod-end 518 opens counterbalance valve 510. In embodiments, control system 500 may control tilling tool 100 in different operational modes as described in FIGS. 2-4.

In embodiments, a combination valve converts a single input flow 502 from the control system source (e.g., hydraulic oil) into two output flows, an output flow at 516 and an output flow at 522. In embodiments, the output flows can be sequenced to raise a machine (e.g., machine 102 as described in FIGS. 1-3) prior to folding wings (e.g., wings 104 as describes in FIGS. 1-3). Thus, 516 receives pressure at the base end of the lift cylinders associated with the machine and then 522 receives pressure at the rod end of the wing fold cylinders associated with the wings. In embodiments, valve 512 can be used within control system 500 to provide sequencing control by providing flow from input flow 502 to output flow 504 when a particular pressure occurs in input flow 502. In embodiments, valve 512 may be a sequencing valve and the pressure required to provide flow to output flow 504 is adjustable.

In embodiments, reversing the flow to the combination valve may convert the single flow 504 into two outputs flows at 520 and 518. Thus, the output flows are now sequenced to fully unfold the wings prior to lowering the machine. As such, 520 receives pressure at the base end of the wing fold cylinders associated with the wings, and then, upon a particular pressure level occurring, valve 514 allows for 518 to receive pressure at the rod end of the lift cylinders associated with the machine. In embodiments, the reverse flow sequencing is controlled by a pressure change and/or value that results in the unfolding circuit triggering a flow to the lowering circuit.

In embodiments, valve 514, which is used to provide sequenced control of flow from the unfolding circuit to the lowering circuit, may have an adjustable control that changes the pressure change and/or valve required to initiate the sequenced control. In embodiments, counterbalance valve 510 prevents gravity from allowing the machine to lower prior to the wings fully unfolding.

What is claimed is:

1. A method, comprising:
    converting a single input flow of a single power source into two output flows of the single power source, wherein the single input flow and the two output flows are connected in a parallel flow relationship;
    sequencing the two output flows of the single power source to completely raise a machine prior to folding of wings associated with the machine;
    reversing the two output flows of the single power source; and
    lowering the machine and unfolding the wings simultaneously, based on the reversing the two output flows of the single power source.

2. The method of claim 1, wherein the machine and the wings are associated with a tilling tool.

3. The method of claim 1, wherein the sequencing the two output flows of the single power source is based on a pressure change in one of the two output flows of the single power source which triggers flow in another of the two output flows of the single power source.

4. The method of claim 3, wherein the pressure change is adjustable.

5. The method of claim 1, further comprising:
reversing the two output flows of the single power source such that said reversing causes the wings to unfold prior to lowering the machine, wherein:
the reversing the two output flows of the single power source is based on reversing a flow to a valve of the single power source, and
the reversing the two output flows of the single power source is controlled by a pressure change in an unfolding circuit that triggers flow to a lowering circuit.

6. The method of claim 5, wherein a counterbalance valve prevents gravity from allowing the machine to lower prior to the wings fully unfolding.

7. The method of claim 1, wherein the two output flows of the single power source are associated with a hydraulic system.

8. The method of claim 1, wherein the two output flows of the single power source are associated with a pneumatic system.

9. A tilling tool having a machine part that can be raised and lowered and wings that can be folded and unfolded, said tilling tool comprising a control system for controlling the machine part and wings, the control system having a single power source and being configured to:
convert a single input flow of the single power source into two output flows of the single power source, wherein the single input flow and the two output flows are connected in a parallel flow relationship;
sequence the two output flows of the single power source to completely raise the machine part prior to folding the wings;
reverse the two output flows of the single power source; and
lower the machine and unfold the wings simultaneously, based on the reversing the two output flows of the single power source.

* * * * *